US012614674B2

(12) United States Patent　　　　(10) Patent No.:　US 12,614,674 B2
Park et al.　　　　　　　　　　　　(45) Date of Patent:　　　Apr. 28, 2026

(54) MULTILAYER ELECTRONIC COMPONENT

(71) Applicant: SAMSUNG ELECTRO-MECHANICS CO., LTD., Suwon-si (KR)

(72) Inventors: Hye Jin Park, Suwon-si (KR); Hong Je Choi, Suwon-si (KR); Ji Hye Han, Suwon-si (KR); Byung Woo Kang, Suwon-si (KR); Su Yun Yun, Suwon-si (KR); Sang Wook Lee, Suwon-si (KR); Jung Min Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 457 days.

(21) Appl. No.: 18/139,443

(22) Filed: Apr. 26, 2023

(65) Prior Publication Data

US 2024/0203656 A1　　Jun. 20, 2024

(30) Foreign Application Priority Data

Dec. 15, 2022　　(KR) ......................... 10-2022-0175793

(51) Int. Cl.
H01G 4/232　　　　(2006.01)
H01G 4/30　　　　(2006.01)

(52) U.S. Cl.
CPC .............. H01G 4/2325 (2013.01); H01G 4/30 (2013.01)

(58) Field of Classification Search
CPC .......... H01G 4/30; H01G 4/232; H01G 4/248; H01G 4/228; H10G 4/2325

USPC ...................... 361/301.4, 306.3, 321.1, 321.3
See application file for complete search history.

(56) References Cited

U.S. PATENT DOCUMENTS

| | | |
|---|---|---|
| 2014/0233147 A1 | 8/2014 | Hong et al. |
| 2015/0170786 A1 | 6/2015 | Hong et al. |
| 2015/0213953 A1 | 7/2015 | Jun et al. |
| 2015/0279563 A1 | 10/2015 | Otani |
| 2017/0032896 A1* | 2/2017 | Otani ........................ H01G 4/30 |

(Continued)

FOREIGN PATENT DOCUMENTS

| | | |
|---|---|---|
| KR | 10-2017-0118584 A | 10/2017 |
| KR | 10-2019-0004630 A | 1/2019 |
| KR | 10-2019-0004631 A | 1/2019 |

OTHER PUBLICATIONS

European Search Report dated Oct. 9, 2023 , issued in corresponding European Patent Application No. 23171341.3.

*Primary Examiner* — Arun Ramaswamy
(74) *Attorney, Agent, or Firm* — Morgan, Lewis & Bockius LLP

(57) ABSTRACT

An example embodiment of the present disclosure provides a multilayer electronic component including an external electrode including an electrode layer and a conductive resin layer disposed on the electrode layer. The conductive resin layer includes conductive particles including at least one of Cu particles, $Cu_3Sn$ and $Cu_6Sn_5$, and a resin, and in cross-sections of the conductive resin layer, a ratio of an area occupied by $Cu_3Sn$ to the total area occupied by the Cu particles, $Cu_3Sn$, and $Cu_6Sn_5$ is 1.88% to 38.89%, and a ratio of an area occupied by $Cu_6Sn_5$ to the total area occupied by the Cu particles, $Cu_3Sn$ and $Cu_6Sn_5$ is 31.54% to 97.23%.

16 Claims, 6 Drawing Sheets

(56)         References Cited

U.S. PATENT DOCUMENTS

| | | | |
|---|---|---|---|
| 2017/0301468 A1 | 10/2017 | Kim et al. | |
| 2018/0166215 A1* | 6/2018 | Hamanaka | H01G 4/12 |
| 2019/0013150 A1 | 1/2019 | Koo et al. | |
| 2020/0176189 A1* | 6/2020 | Koo | H01G 4/2325 |
| 2021/0193391 A1 | 6/2021 | Yi et al. | |
| 2021/0343476 A1 | 11/2021 | Nomura | |
| 2021/0366654 A1 | 11/2021 | Guchi et al. | |
| 2022/0165500 A1 | 5/2022 | Lee et al. | |

* cited by examiner

I - I'

FIRST
DIRECTION

SECOND
DIRECTION

THIRD
DIRECTION

FIRST
DIRECTION

THIRD
DIRECTION

II - II'

FIRST
DIRECTION

SECOND
DIRECTION

K1

FIRST
DIRECTION

SECOND
DIRECTION

FIRST
DIRECTION

SECOND
DIRECTION

FIRST
DIRECTION

SECOND
DIRECTION

FIRST
DIRECTION

SECOND
DIRECTION

MULTILAYER ELECTRONIC COMPONENT

CROSS-REFERENCE TO RELATED APPLICATION(S)

This application claims benefit of priority to Korean Patent Application No. 10-2022-0175793 filed on Dec. 15, 2022, in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser mounted on the printed circuit boards of various types of electronic products such as imaging devices, including a liquid crystal display (LCD) and a plasma display panel (PDP), computers, smartphones, and mobile phones, and serves to charge or discharge electricity therein or therefrom.

The multilayer ceramic capacitor may be used as a component of various electronic devices due to having a small size, ensuring high capacity and being easily mounted. With the miniaturization and high output power of various electronic devices such as computers and mobile devices, demand for miniaturization and high capacity of multilayer ceramic capacitors has also been increasing.

Meanwhile, conventionally, an external electrode having a two-layer structure of a sintered electrode layer and a conductive resin layer has been applied to protect a multilayer ceramic capacitor from tensile stress generated in a mechanical or thermal environment. However, when a high-temperature reflow environment is applied to the conductive resin layer, lifting defects may occur at an interface between the sintered electrode layer and a resin electrode layer due to out gas generated in the conductive resin layer.

In addition, a conductive resin layer is present in a form in which conductive metal particles are dispersed in a resin, and secures electrical connectivity through hopping conduction, which may cause a problem in that the conductive resin layer may have lower electrical connectivity than the sintered electrode layer.

In order to solve such a problem, a method for applying a conductive resin layer in which an intermetallic compound such as $Cu_3Sn$, $Cu_6Sn_5$, or the like, is included in an external electrode may be considered. However, in order to more effectively prevent lifting defects at the interface between the sintered electrode layer and the resin electrode layer, it is necessary to appropriately adjust a presence ratio of $Cu_3Sn$ and $Cu_6Sn_5$.

SUMMARY

An aspect of the present disclosure is to prevent lifting defects from occurring due to out gas generated in a conductive resin layer.

An aspect of the present disclosure is to improve the electrical connectivity of the conductive resin layer.

An aspect of the present disclosure is to solve a problem in which the remaining Sn in the conductive resin layer is eluted to an outer surface of the conductive resin layer to reduce a plating property of multilayer electronic components.

However, the aspects of the present disclosure are not limited to the above-described contents, and may be more easily understood in the process of describing specific embodiments of the present disclosure.

According to an aspect of the present disclosure, a multilayer electronic component may include: a body in which a dielectric layer and an internal electrode are alternately arranged in a first direction, the body including first and second surfaces opposing each other in the first direction, third and fourth surfaces connected to the first and second surfaces and opposing each other in a second direction, and fifth and sixth surfaces connected to the first to fourth surfaces and opposing each other in a third direction; and an external electrode including an electrode layer disposed on the third and fourth surfaces and a conductive resin layer disposed on the electrode layer, and the conductive resin layer may include a resin and conductive particles including Cu particles, $Cu_3Sn$, and $Cu_6Sn_5$, along the first and second directions, in a cross-section of the conductive resin layer, a ratio of an area occupied by $Cu_3Sn$ to a total area occupied by the Cu particles, $Cu_3Sn$ and $Cu_6Sn_5$ may be 1.88% to 38.89%, and a ratio of an area occupied by $Cu_6Sn_5$ to the total area occupied by the Cu particles, $Cu_3Sn$ and $Cu_6Sn_5$ may be 31.54% to 97.23%.

According to an aspect of the present disclosure, a multilayer electronic component may include: a body in which a dielectric layer and an internal electrode are alternately arranged in a first direction, the body including first and second surfaces opposing each other in the first direction, and third and fourth surfaces connected to the first and second surfaces and opposing each other in a second direction; and an external electrode including an electrode layer disposed on the third and fourth surfaces and a conductive resin layer disposed on the electrode layer, wherein the conductive resin layer includes a resin and conductive particles including Cu particles, $Cu_3Sn$, and $Cu_6Sn_5$, and along the first and second directions, in a cross-section of the conductive resin layer, a ratio of an area occupied by $Cu_3Sn$ to a total area occupied by the Cu particles, $Cu_3Sn$, and $Cu_6Sn_5$ is 1.88% to 38.89%.

According to an exemplary embodiment in the present disclosure, it is possible to prevent lifting defects from occurring due to out gas generated in a conductive resin layer.

According to an exemplary embodiment in the present disclosure, it is possible to improve the electrical connectivity of the conductive resin layer.

According to an exemplary embodiment in the present disclosure, it is possible to solve a problem in which the remaining Sn in the conductive resin layer is eluted to an outer surface of the conductive resin layer to reduce a plating property of multilayer electronic components.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
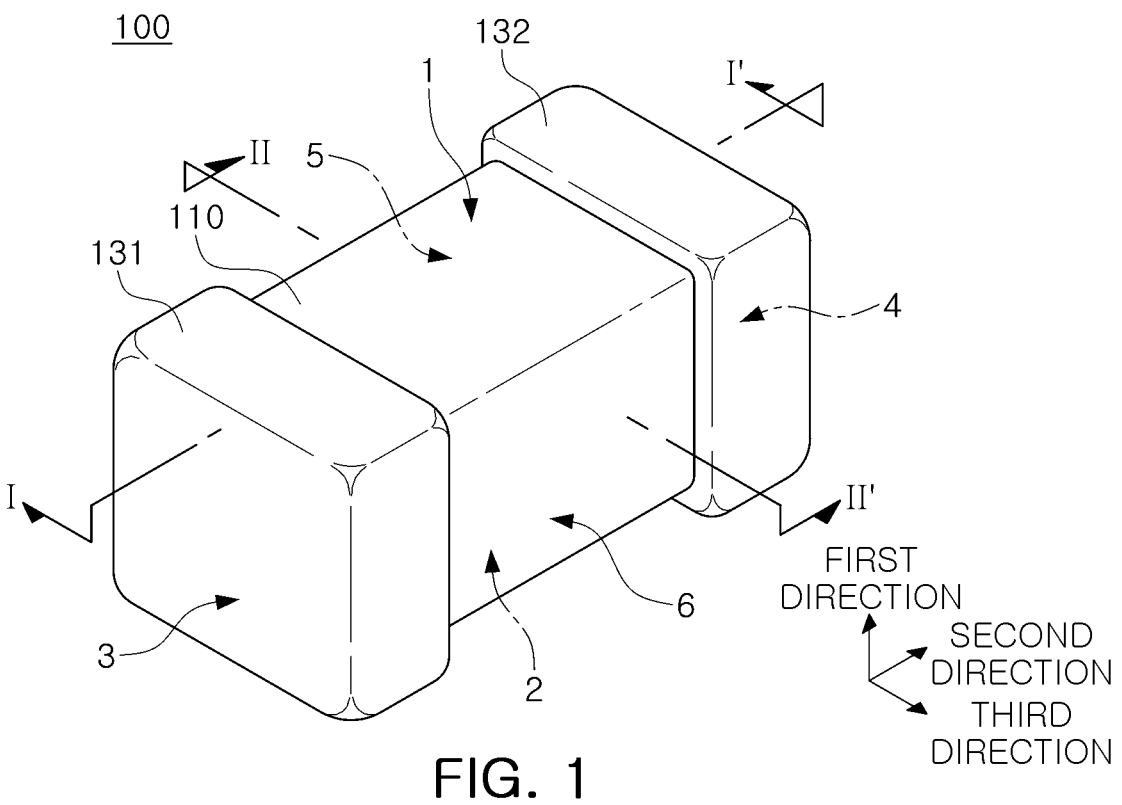
FIG. 1 is a perspective view schematically illustrating a multilayer electronic component according to an example embodiment of the present disclosure.

Hereinafter, embodiments of the present disclosure will be described with reference to specific example embodiments and the attached drawings. The embodiments of the present disclosure may, however, be exemplified in many different forms and should not be construed as being limited to the specific embodiments set forth herein. The example embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily shown for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

FIG. 1 is a perspective view schematically illustrating a multilayer electronic component according to an example embodiment of the present disclosure.

Figure 2:
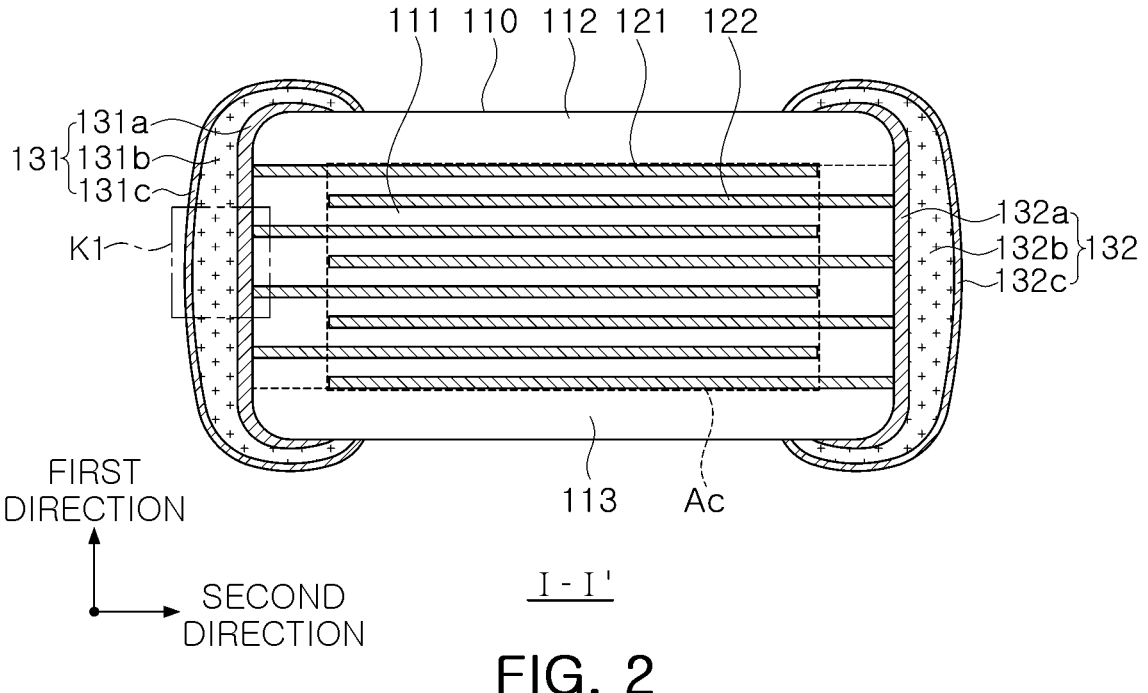
FIG. 2 is a cross-sectional view schematically illustrating FIG. 1 taken along line I-I' of FIG. 1.

FIG. 2 is a cross-sectional view schematically illustrating FIG. 1 taken along line I-I' of FIG. 1.

Figure 3:
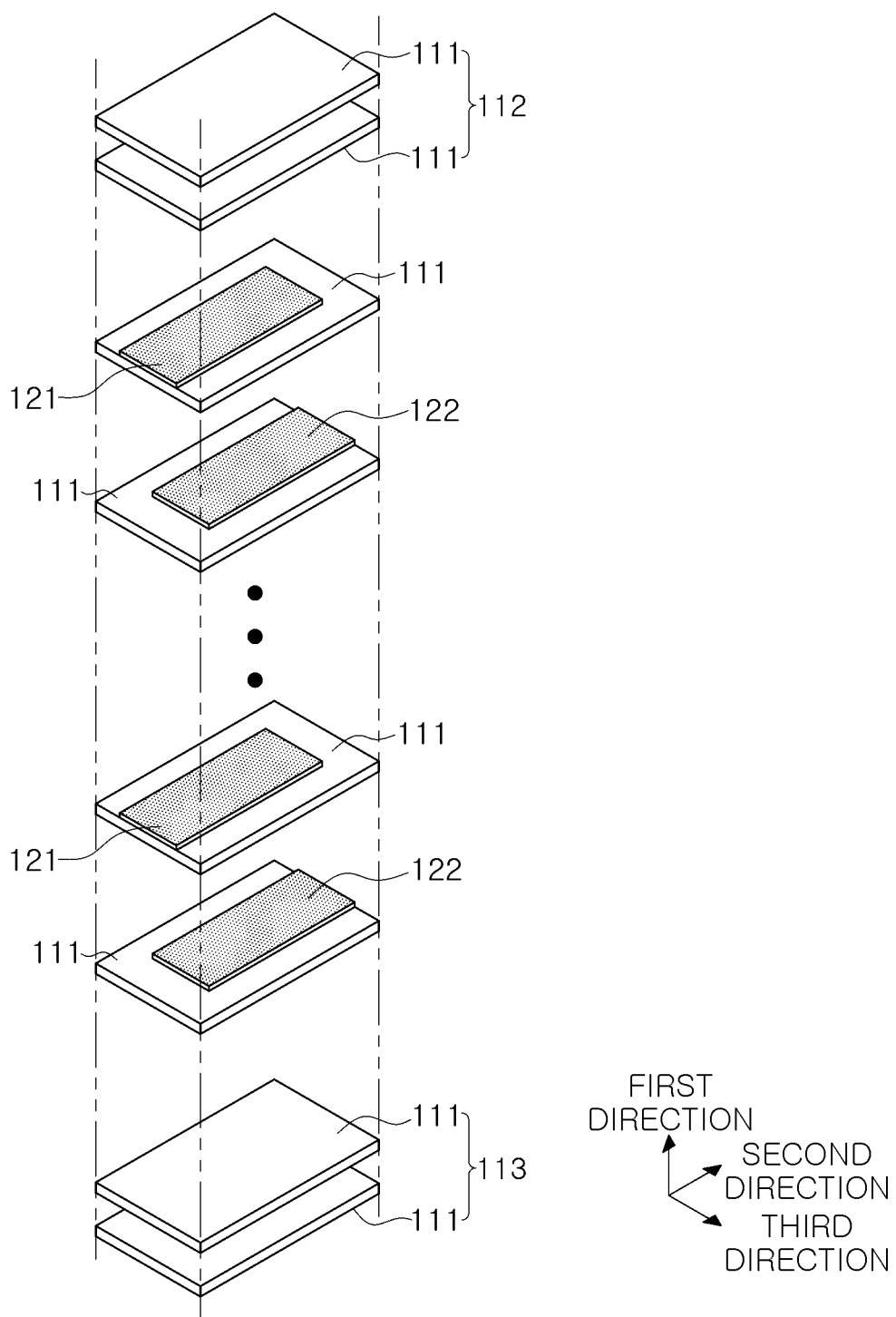
FIG. 3 is an exploded perspective view schematically illustrating a body of the multilayer electronic component according to an example embodiment of the present disclosure.

FIG. 3 is an exploded perspective view schematically illustrating a body of the multilayer electronic component according to an example embodiment of the present disclosure.

Figure 4:
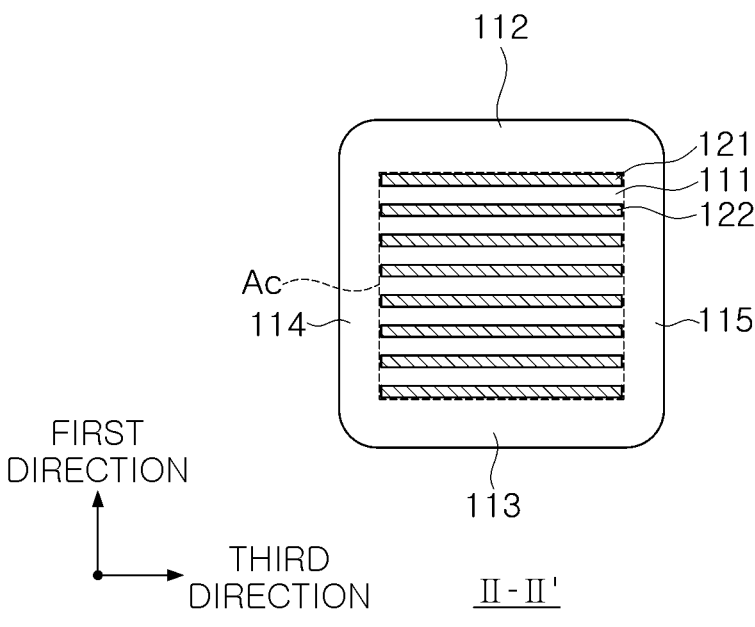
FIG. 4 is a cross-sectional view schematically illustrating FIG. 1 taken along line II-II' of FIG. 1.

FIG. 4 is a cross-sectional view schematically illustrating FIG. 1 taken along line II-II' of FIG. 1.

Figure 5:
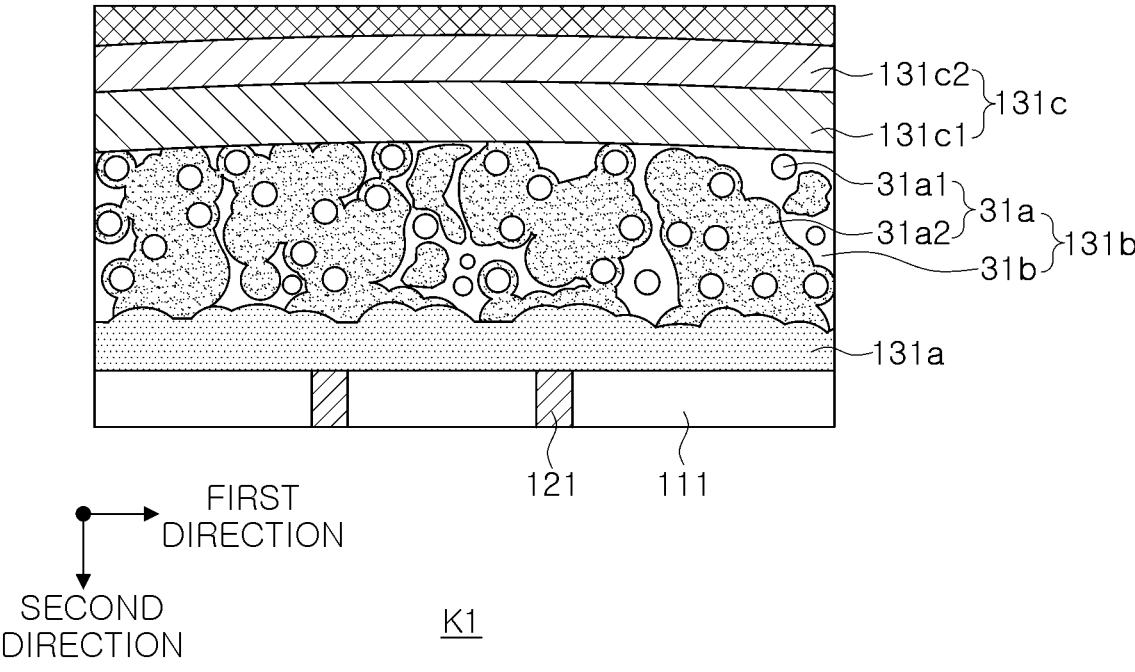
FIG. 5 is an enlarged view of region K1 of FIG. 2.

FIG. 5 is an enlarged view of region K1 of FIG. 2.

Referring to FIGS. 1 to 5, a multilayer electronic component according to an aspect of the present disclosure may include a body 110 in which a dielectric layer 111 and internal electrodes 121 and 122 are alternately arranged in the first direction, and which includes first and second surfaces 1 and 2 opposing each other in the first direction, third and fourth 3 and 4 surfaces connected to the first and second surfaces 1 and 2 and opposing each other in the second direction, and fifth and sixth surfaces 5 and 6 connected to the first to fourth surfaces and opposing each other in the third direction, and external electrodes 131 and 132 including electrode layers 131a and 132a disposed on the third and fourth surfaces and conductive resin layers 131b and 132b disposed on the electrode layer, and the conductive resin layer may include conductive particles 31a including at least one of Cu particles, $Cu_3Sn$ and $Cu_6Sn_5$, and a resin 31b, and in first and second directional cross-section of the conductive resin layer, a ratio of an area occupied by $Cu_3Sn$ to the total area occupied by the Cu particles, $Cu_3Sn$ and $Cu_6Sn_5$ may be 1.88% to 38.89%, and a ratio of an area occupied by $Cu_6Sn_5$ to the total area occupied by the Cu particles, $Cu_3Sn$ and $Cu_6Sn_5$ may be 31.54% to 97.23%.

As described above, when the conductive resin layer is applied to protect the multilayer electronic component from stress generated in a mechanical or thermal environment, lifting defects may occur at an interface between the electrode layer and the conductive resin layer due to out gas generated in the conductive resin layer, and electrical connectivity may be reduced.

On the other hand, in the case of a multilayer electronic component 100 according to an example embodiment of the present disclosure, in the first and second directional cross-section of the conductive resin layers 131b and 132b, since the ratio of the area occupied by $Cu_3Sn$ to the total area occupied by the Cu particles, $Cu_3Sn$, and $Cu_6Sn_5$ is 1.88% to 38.89%, and the ratio of the area occupied by $Cu_6Sn_5$ to the total area occupied by the Cu particles, $Cu_3Sn$, and $Cu_6Sn_5$ is 31.54% to 97.23%, the lifting defects may be prevented at the interface between the electrode layers 131a and 132a and the conductive resin layers 131b and 132b, thereby providing the multilayer electronic component having excellent reliability.

Hereinafter, each component included in the multilayer electronic component 100 according to an example embodiment of the present disclosure will be described in more detail.

There is no particular limitation on the specific shape of the body 110, but as illustrated, the body 110 may have a hexahedral shape or a similar shape thereof. Due to contraction of the ceramic powder including in the body 110 or grinding of corner portions of the body 110 during a sintering process, the body 110 may not have a hexahedral shape with a complete straight line, but may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first, second, third and fourth surfaces 1, 2, 3 and 4 and opposing each other in the third direction.

The body 110 may have the dielectric layer 111 and the internal electrodes 121 and 122 which are alternately stacked with one another. In a state in which a plurality of dielectric layers 111 forming the body 110 are sintered, boundaries between adjacent dielectric layers 111 may be so integrated so as to be difficult to identify without using a scanning electron microscope (SEM).

The dielectric layer 111 may be formed by producing a ceramic slurry including ceramic powder, an organic solvent and a binder, coating and drying the slurry on a carrier film to prepare a ceramic green sheet, and then sintering the ceramic green sheet. The ceramic powder is not particularly limited as long as it may obtain a sufficient capacitance, but for example, barium titanate based (BaTiO$_3$) powder may be used as the ceramic powder.

An average thickness of the dielectric layer 111 does not need to be particularly limited, but may be, for example, 10 μm or less. In addition, the average thickness of the dielectric layer 111 may be arbitrarily set according to desired characteristics or uses. For example, for electronic components for a high voltage electrical apparatus, the average thickness of the dielectric layer 111 may be less than 4.8 μm, and for electronic components for small IT, the average thickness of the dielectric layer 111 may be 0.5 μm or less in order to achieve miniaturization and high capacity, but the present disclosure is not limited thereto.

Here, the average thickness of the dielectric layer 111 denotes the size of the dielectric layer 111 disposed between the internal electrodes 121 and 122 in the first direction. The average thickness of the dielectric layer 111 may be measured by scanning first and second directional cross-section of the body 110 with a scanning electron microscope (SEM) of 10,000× magnification. More specifically, the average value may be measured by measuring the thickness at multiple areas of one dielectric layer 111, for example, 30 points which are spaced apart from each other at equal intervals in the second direction. The 30 points with the equal intervals may be designated in a capacity forming portion Ac described below. In addition, when the average value is measured by extending an average value measurement up to 10 dielectric layers 111, the average size of the dielectric layers 111 may be further generalized. Other methods and/or tools appreciated by one of ordinary skill in the art, even if not described in the present disclosure, may also be used.

The internal electrodes 121 and 122 may be alternately disposed with the dielectric layer 111. For example, a pair of electrodes 121 and 122 having different polarities may be disposed to face each other with the dielectric layer 111 interposed therebetween. A plurality of first internal electrodes 121 and a plurality of second internal electrodes 122 may be electrically separated from each other by a dielectric layer 111 disposed therebetween. The first internal electrode 121 may be connected to the third surface, and the second internal electrode 122 may be connected to the fourth surface.

Conductive metal included in the internal electrodes 121 and 122 may be at least one of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The internal electrodes 121 and 122 may be formed by coating and sintering a conductive paste for internal electrodes including a conductive metal with a predetermined thickness on a ceramic green sheet. As a method for printing the conductive paste for internal electrodes, a screen printing method or a gravure printing method may be used, and the present disclosure is not limited thereto.

The average thickness of the internal electrodes 121 and 122 does not need to be particularly limited, but may be, for example, 3 μm or less. In addition, the average thickness of the internal electrodes 121 and 122 may be arbitrarily set according to desired characteristics or uses. For example, for electronic components for a high voltage electrical apparatus, the average thickness of internal electrodes 121 and 122 may be less than 1.3 μm, and for electronic components for small IT, the average thickness of internal electrodes 121 and 122 may be 0.4 μm or less in order to achieve miniaturization and high capacity, but the present disclosure is not limited thereto.

The average thickness of the internal electrodes 121 and 122 denotes the size of the internal electrodes 121 and 122 in the first direction. Here, the average thickness of the internal electrodes 121 and 122 may be measured by scanning first and second directional cross-section of the body 110 with a scanning electron microscope (SEM) of 10,000× magnification. More specifically, the average value may be measured by measuring the thickness at multiple areas of one internal electrode 121 or 122, for example, 30 points which are spaced apart from each other at equal intervals in the second direction. The 30 points with the equal intervals may be designated in the capacity forming portion Ac described below. In addition, when the average value is measured by extending an average value measurement up to 10 internal electrodes 121 and 122, the average size of the internal electrodes 121 and 122 may be further generalized. Other methods and/or tools appreciated by one of ordinary skill in the art, even if not described in the present disclosure, may also be used.

The body 110 may include the capacity forming portion Ac which is disposed in the body 110 and in which the capacity is formed by including the first and second internal electrodes 121 and 122 alternately disposed with the dielectric layer 111 interposed therebetween, and a first cover portion 112 and a second cover portion 113 respectively disposed on opposite surfaces opposing each other in the first direction of the capacity forming portion Ac. The cover portions 112 and 113 may basically serve to prevent damage to the internal electrode due to physical or chemical stress. The cover portions 112 and 113 may have the same configuration as the dielectric layer 111 except that the cover portions 112 and 113 do not include internal electrodes.

The thickness of the cover portions 112 and 113 need not be particularly limited. However, for miniaturization and high-capacity of the multilayer electronic component, the average thickness of the cover portions 112 and 113 may be 100 μm or less, 30 μm or less, or 20 μm or less. Here, the average thickness of the cover portions 112 and 113 denotes average thicknesses of each of the first cover portion 112 and the second cover portion 113.

The average thickness of the cover portions 112 and 113 may denote an average size of the cover portions 112 and 113 in the first direction, and may be a value obtained by averaging first directional sizes measured at five points spaced apart from each other at equal intervals in the first and second directional cross-section of the body 110.

The body 110 may include margin portions 114 and 115 disposed on opposite surfaces opposing each other in the third direction of the capacity forming portion Ac. That is, the margin portions 114 and 115 may denote a region between opposite ends of the internal electrodes 121 and 122 in a cross-section in which the body 110 is cut in the first direction and the third direction and a boundary surface of the body 110. In this case, the margin portions 114 and 115 may include a first margin portion 114 connected to the fifth surface 5 of the body 110 and a second margin portion 115 connected to the sixth surface 6 of the body 110.

The margin portions 114 and 115 may include the same material as the dielectric layer 111 except that the margin portions 114 and 115 do not include the internal electrodes 121 and 122. The margin portions 114 and 115 may basically serve to prevent damage to the internal electrodes 121 and 122 due to physical or chemical stress.

The margin portions 114 and 115 may be formed by coating and sintering the conductive paste for internal electrodes except for an area in which the margin portions will be formed on the ceramic green sheet. Alternatively, in order to suppress step portions by the internal electrodes 121 and 122, the margin portion 114 and 115 may be formed by stacking a single dielectric layer or two or more dielectric layers on opposite surfaces opposing each other in the third direction of the capacity forming portion Ac.

The average thickness of the margin portions 114 and 115 need not be particularly limited. However, for miniaturization and high capacity of the multilayer electronic component, the average thickness of the margin portions 114 and 115 may be 100 μm or less, 20 μm or less, or 15 μm or less. Here, the average thickness of the margin portions 114 and 115 denotes average thicknesses of each of the first margin portion 114 and the second margin portion 115.

The average thickness of the margin portions 114 and 115 may denote the average size of the margin portions 114 and 115 in the third direction, and may be a value obtained by averaging third directional sizes measured at five points which are spaced apart from each other at equal intervals in the first and third directional cross-sections of the body 110.

The external electrodes 131 and 132 may be disposed on the third and fourth surfaces 3 and 4 of the body 110 and may extend partially on the first, second, fifth and sixth surfaces. The external electrode may include a first external electrode 131 disposed on the third surface and connected to the first internal electrode 121 and a second external electrode 132 disposed on the fourth surface and connected to the second internal electrode 122.

The first external electrode 131 may include a first electrode layer 131a disposed on the third surface, a first conductive resin layer 131b disposed on the first electrode layer, and a first plating layer 131c disposed on the first conductive resin layer 131b.

The second external electrode 132 may include a second electrode layer 132a disposed on the fourth surface, a second conductive resin layer 132b disposed on the second electrode layer, and a second plating layer 132c disposed on the second conductive resin layer 132b.

The electrode layers 131a and 132a may serve to connect the internal electrodes 121 and 122 and the external electrodes 131 and 132. The electrode layers 131a and 132a may include a first metal and glass, for example, Cu and glass. However, the present disclosure is not limited thereto, and the first metal included in the electrode layers 131a and 132a may be, for example, one or more of Cu, Ni, Pd, Ag, Au, Pt, Sn, Ti, and alloys thereof. Meanwhile, the glass included in the electrode layers 131a and 132a may serve to improve coupling force between the body 110 and the external electrodes 131 and 132.

The electrode layers 131a and 132a may be formed by dipping the third and fourth surfaces 3 and 4 of the body 110 into a conductive paste including the first metal and glass, transferring a sheet including the first metal and glass, and then sintering the sheet.

Hereinafter, the first external electrode 131 will be described in more detail with reference to FIG. 5. However, since the first external electrode 131 and the second external electrode 132 are symmetrical with respect to the second direction, the description of the first external electrode 131 may be identically applied to the second external electrode 132.

The first conductive resin layer 131b may include conductive particles 31a including at least one of metal particles 31a1 and a first intermetallic compound 31a2, and a resin 31b. The resin 31b included in the first conductive resin layer 131b may basically serve to absorb impact applied to the multilayer electronic component. Accordingly, cracks may be prevented from occurring in the multilayer electronic component by absorbing stress or tensile stress applied when mounting the substrate. The resin 31b included in the first conductive resin layer 131b is not particularly limited, but may be, for example, a thermosetting resin.

The metal particles 31a1 included in the first conductive resin layer 131b may be Cu particles. However, the present disclosure is not limited thereto, and at least some of the plurality of metal particles 31a1 may be Ag particles. As illustrated in FIG. 5, the metal particles 31a1 may be spherical particles in shape, but the present disclosure is not limited thereto, and the metal particles 31a1 may include one or more of spherical particles and flake-type particles.

Here, the spherical particles may include a shape that is not completely spherical, for example, a shape in which the length ratio (long axis/short axis) between a long axis and a short axis is 1.45 or less. The flake-type particles refer to particles having a flat and elongated shape, and the present disclosure is not particularly limited, but the flake-type particles may have, for example, a length ratio (long axis/ short axis) between a long axis and a short axis of 1.95 or more. The lengths of the long axes and short axes of the spherical particles and the flake-type particles may be measured from an image obtained by scanning a cross-section of the first conductive resin layer 131b cut in the first and second directions in the center of the body 110 in the third direction with the scanning electron microscope (SEM). Other methods and/or tools appreciated by one of ordinary skill in the art, even if not described in the present disclosure, may also be used.

The first intermetallic compound 31a2 included in the first conductive resin layer 131b may include $Cu_3Sn$ and $Cu_6Sn_5$. The $Cu_3Sn$ and the $Cu_6Sn_5$ may be formed by reacting the Cu particles with a low melting point metal including Sn or a Sn alloy during a drying and hardening heat treatment process of the first conductive resin layer 131b.

The first intermetallic compound 31a2 may be formed in the first conductive resin layer 131b in a network form, and at least a portion of the first intermetallic compound 31a2 may connect the first electrode layer 131a and the first plating layer 131c. Accordingly, it is possible to prevent lifting defects from occurring at an interface between the first electrode layer 131a and the first conductive resin layer 131b, and improve electrical connectivity in the first conductive resin layer 131b.

According to an example embodiment of the present disclosure, in the first and second directional cross-section of the first conductive resin layer 131b, a ratio of an area occupied by $Cu_3Sn$ to the total area occupied by the Cu particles, $Cu_3Sn$, and $Cu_6Sn_5$ is 1.88% to 38.89%, and a ratio of an area occupied by $Cu_6Sn_5$ to the total area occupied by the Cu particles, $Cu_3Sn$, and $Cu_6Sn_5$ is 31.54% to 97.23%.

Since $Cu_6Sn_5$ has a higher reaction speed than $Cu_3Sn$ in a mutual reaction process between Cu and Sn, $Cu_6Sn_5$ may be preferentially formed among $Cu_6Sn_5$ and $Cu_3Sn$. Meanwhile, when an environment richer in Cu than Sn is formed in the first conductive resin layer 131b simultaneously with forming $Cu_6Sn_5$, a portion of $Cu_6Sn_5$ may achieve phase transition to $Cu_3Sn$.

On the other hand, since a thermal expansion coefficient of $Cu_3Sn$ is larger than that of $Cu_6Sn_5$, $Cu_3Sn$ has a larger expansion rate by reflow application and a larger contraction rate at room temperature than those of $Cu_6Sn_5$. Accordingly, when a formation ratio of $Cu_3Sn$ in the first conductive resin layer $131b$ is excessive, lifting defects of the first conductive resin layer due to expansion and contraction of $Cu_3Sn$ may occur. Therefore, it is important to effectively prevent the lifting defects by controlling the ratio of the area occupied by $Cu_6Sn_5$ and the ratio of the area occupied by $Cu_3Sn$.

Accordingly, the present inventors have found that in the first and second directional cross-section of the first conductive resin layer $131b$, when the ratio of the areas occupied by each of $Cu_3Sn$ and $Cu_6Sn_5$ to the total area occupied by the Cu particles, $Cu_3Sn$, and $Cu_6Sn_5$ satisfies the aforementioned range, the lifting defects can be effectively prevented from occurring at the interface between the first electrode layer $131a$ and the first conductive resin layer $131b$ Accordingly, it is expected that in the first and second directional cross-section of the first conductive resin layer $131b$, when the ratio of the area occupied by $Cu_6Sn_5$ to the total area occupied by the Cu particles, $Cu_3Sn$, and $Cu_6Sn_5$ is less than 31.54%, or when the ratio of the area occupied by $Cu_3Sn$ to the total area occupied by the Cu particles, $Cu_3Sn$, and $Cu_6Sn_5$ is more than 38.89%, since the first intermetallic compound $31a2$ is not sufficiently formed, or a ratio of the area of $Cu_3Sn$ with a high thermal expansion coefficient in the first intermetallic compound $31a2$ is excessive, an anti-lifting effect may be reduced.

According to an example embodiment of the present disclosure, in the first and second directional cross-section of the first conductive resin layer $131b$, the ratio of the area occupied by the Cu particles to the total area occupied by the Cu particles, $Cu_3Sn$, and $Cu_6Sn_5$ may be 0.3% or more. When the ratio of the area occupied by the Cu particles to the total area occupied by the Cu particles, $Cu_3Sn$, and $Cu_6Sn_5$ is less than 0.3%, since Sn may be excessively included in the first conductive resin layer $131b$ as compared to the Cu particles, the remaining Sn may be eluted to the outer surface of the first conductive resin layer $131b$. Accordingly, since a uniform plating layer may not be formed on the first conductive resin layer $131b$, mounting characteristics may be reduced.

In addition, according to an example embodiment of this disclosure, in the first and second directional cross-section of the first conductive resin layer $131b$, the ratio of the area occupied by the Cu particles to the total area occupied by Cu particles, $Cu_3Sn$, and $Cu_6Sn_5$ may be 58.79% or less. When the ratio of the area occupied by the Cu particles to the total area occupied by the Cu particles, $Cu_3Sn$, and $Cu_6Sn_5$ is more than 58.79%, it may be difficult to satisfy the area ratio of the $Cu_3Sn$ and the $Cu_6Sn_5$, and a large amount of out gas may be generated due to oxidation of the resin by the Cu particles.

In this case, the first and second directional cross-section of the first conductive resin layer $131b$ may be cross-sections cut from the center of the body $110$ in the third direction. The ratio of the area occupied by $Cu_3Sn$ and the ratio of the area occupied by $Cu_6Sn_5$ may be measured by observing the first and second directional cross-section of the first conductive resin layer $131b$ cut from the center of the body $110$ in the third direction at a magnification of 2000 times or more with the scanning electron microscope (SEM). Other methods and/or tools appreciated by one of ordinary skill in the art, even if not described in the present disclosure, may also be used.

In addition, in the first and second directional cross-section of the first conductive resin layer $131b$, the ratio of the area occupied by $Cu_3Sn$ and the ratio of the area occupied by $Cu_6Sn_5$ may be measured in a region in which a first directional size is 59 µm to 149 µm and a second directional size is 25 µm to 50 µm based on the center in the second direction.

However, the present disclosure is not limited thereto, and for example, the ratio of the area occupied by $Cu_3Sn$ and the ratio of the area occupied by $Cu_6Sn_5$ may be measured in the second and third direction cross-sections of the first conductive resin layer $131b$.

In a method of distinguishing Cu particles, $Cu_3Sn$, and $Cu_6Sn_5$ included in the conductive particles $31a$ from each other, the Cu particles, $Cu_3Sn$, and $Cu_6Sn_5$ may be distinguished from each other by performing, through an energy dispersive spectroscopy (EDS), a component analysis on an image obtained by captured the first and second directional cross-section of the first conductive resin layer $131b$ using the scanning electron microscope (SEM) and measuring a component ratio of Cu and Sn included in each region of the conductive particles $31a$. Other methods and/or tools appreciated by one of ordinary skill in the art, even if not described in the present disclosure, may also be used.

In addition, in an image obtained by capturing the first and second directional cross-section of the first conductive resin layer $131b$ using the scanning electron microscope (SEM), since the Cu particles among the Cu particles, $Cu_3Sn$, and $Cu_6Sn_5$ appear the darkest and $Cu_6Sn_5$ appears the brightest, the Cu particles, $Cu_3Sn$, and $Cu_6Sn_5$ may be distinguished from each other using such a contrast difference.

The ratio of the areas occupied by each of the Cu particles, $Cu_3Sn$, and $Cu_6Sn_5$ may be measured by obtaining an image in which the first and second directional cross-section of the first conductive resin layer $131b$ are captured with the scanning electron microscope (SEM) and then processing the image with an ImageJ program. Other methods and/or tools appreciated by one of ordinary skill in the art, even if not described in the present disclosure, may also be used.

In an example embodiment, the conductive particles $31a$ may further include $Ag_3Sn$. The $Ag_3Sn$ may be disposed in the first intermetallic compound $31a2$. $Ag_3Sn$ may be an intermetallic compound formed by reacting Ag included in the Ag particles or a Sn alloy with Sn.

Meanwhile, Ag corresponds to a metal having high reactivity with Sn among metals. In this case, when Ag is excessively added to the first conductive resin layer $131b$, a bending strength of the multilayer electronic component $100$ may be reduced due to excessive intermetallic compound formation. Accordingly, in the first and second directional cross-section of the first conductive resin layer $131b$, the ratio of the area occupied by $Ag_3Sn$ to the total area occupied by the conductive particles $31a$ may be smaller than the ratio of the area occupied by $Cu_3Sn$ to the total area occupied by the conductive particles $31a$. In some embodiments, the total area occupied by the conductive particles $31a$ may be the total area occupied by the Cu particles, $Cu_3Sn$, $Cu_6Sn_5$, and $Ag_3Sn$.

As described above, the ratio of the area occupied by $Ag_3Sn$ to the total area occupied by the conductive particles $31a$ and the ratio of the area occupied by $Cu_3Sn$ to the total area occupied by the conductive particles $31a$ may be measured by obtaining an image in which the first and second directional cross-section of the first conductive resin layer $131b$ are captured with a scanning electron microscope (SEM) and then processing the image with the ImageJ program. Other methods and/or tools appreciated by one of ordinary skill in the art, even if not described in the present disclosure, may also be used.

The first conductive resin layer $131b$ may be formed by, for example, coating Cu powder, low melting point metal powder including Sn or Sn alloy powder and a conductive resin composition including a thermosetting resin on the first electrode layer 131a and then performing a hardening heat treatment thereon. The thermosetting resin may be, for example, a bisphenol A resin, a glycol epoxy resin, a novolac epoxy resin, or a resin with a small molecular weight that is liquid at room temperature among these derivatives. The low melting point metal powder may include at least one of Sn, $Sn_{96.5}Ag_{3.0}Cu_{0.5}$, $Sn_{42}Bi_{58}$ and $Sn_{72}Bi_{28}$.

Meanwhile, a method of controlling the ratio of the area occupied by $Cu_3Sn$ and the ratio of the area occupied by $Cu_6Sn_5$ does not need to be particularly limited. For example, as the content of Cu powder in the conductive resin composition increases as compared to the low melting point metal powder, and the hardening heat treatment time increases, the ratio of the area occupied by $Cu_3Sn$ may increase, but the present disclosure is not limited thereto.

Figure 6:
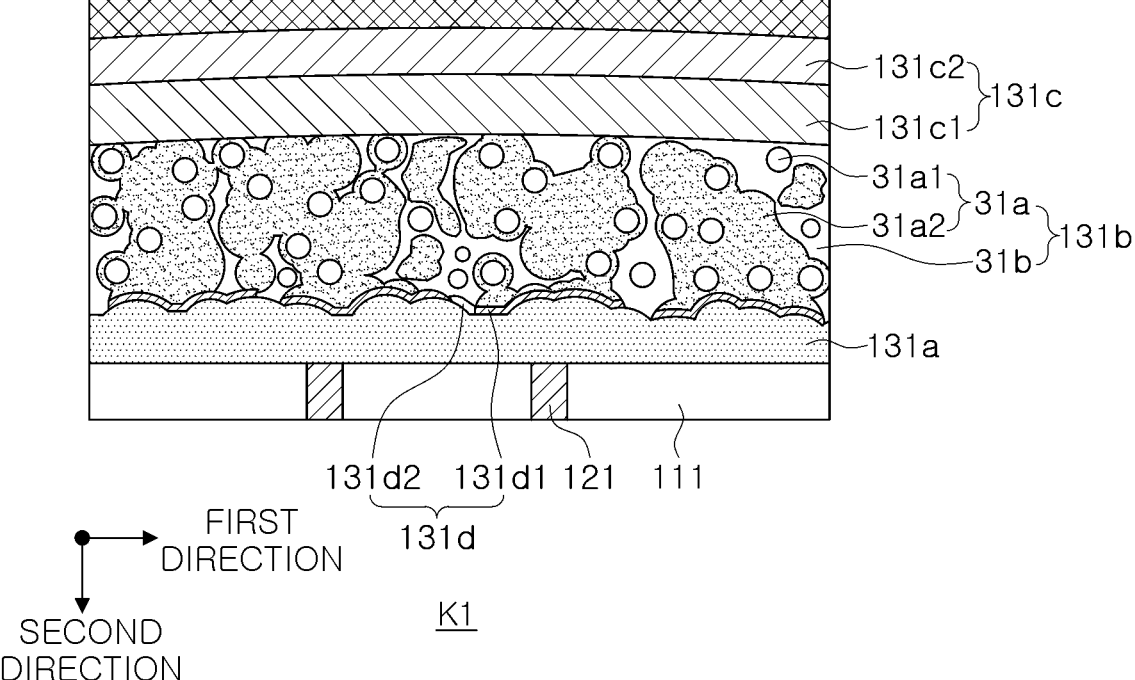
FIG. 6 illustrates a modified example of FIG. 5.

FIG. 6 is a modified example of FIG. 5. As described above, since the first external electrode 131 and the second external electrode 132 are symmetrical to each other with respect to the second direction, the description of the first external electrode 131 may be identically applied to the second external electrode 132.

Referring to FIG. 6, in an example embodiment, the first external electrode 131 may include a first interface layer 131d disposed between the first electrode layer 131a and the first conductive resin layer 131b and including a second intermetallic compound 131d1. The second intermetallic compound 131d1 may be an intermetallic compound between the first metal included in the first electrode layer 131a and the low melting point metal having a melting point lower than that of the first metal. For example, in the case where the first metal includes Cu and the low melting point metal includes Sn or a Sn alloy, the second intermetallic compound 131d1 may include $Cu_3Sn$.

The first interface layer 131d may further include a glass 131d2 in contact with the first electrode layer 131a. When the second intermetallic compound 131d1 is formed by a mutual reaction between metal of the first electrode layer 131a and the low melting point metal including the Sn or Sn alloy, a glass exposed to the surface of the first electrode layer among the glasses included in the first electrode layer 131a may be unreacted and remain, and the remaining glass 131d2 may form the first interface layer 131d together with the second intermetallic compound 131d1.

The first interface layer 131d may be continuously disposed on the first electrode layer or discontinuously disposed on the first electrode layer.

In an example embodiment, at least some of the conductive particles 31a may connect the first interface layer 131d and the first plating layer 131c. Accordingly, electrical connection between the first interface layer 131d and the first plating layer 131c can be improved, and lifting defects can be prevented at an interface between the first conductive resin layer 131b and the first interface layer 131d and an interface between the first conductive resin layer 131b and the first plating layer 131c.

The first plating layer 131c may improve mounting characteristics. The type of first plating layer 131c is not particularly limited, and the first plating layer 131c may be a plating layer including nickel (Ni), tin (Sn), palladium (Pd), and/or alloys including the same, or may be formed of a plurality of layers. For example, the first plating layer 131c may include a first-first plating layer 131c1 and a first-second plating layer 131c2 sequentially stacked on the first conductive resin layer. For example, the first-first plating layer 131c1 may include Ni, and the first-second plating layer 131c2 may include Sn, but the present disclosure is not limited thereto.

Experimental Example

First, a body including a dielectric layer and an inner electrode was prepared, and then the third and fourth surfaces of the body were dipped into a conductive paste including conductivity and glass and are then sintered to prepare an electrode layer. Then, a conductive resin composition including Cu powder, low melting point metal powder including Sn, and a thermosetting resin was coated on the body on which the electrode layer was formed, and a Ni plating layer and a Sn plating layer were sequentially formed on the conductive resin layer to prepare a sample chip including the first and second external electrodes.

Then, after cutting the external electrodes in the first and second directions in the center of the body in the third direction, an image of the conductive resin layer was obtained by scanning the cross-sectional area of the conductive resin layer with the scanning electron microscope (SEM) under the condition in which an acceleration voltage was 10 kV, a working distance (WD) was 10.4 mm, an analysis magnification was 5000 times.

Figure 7A:
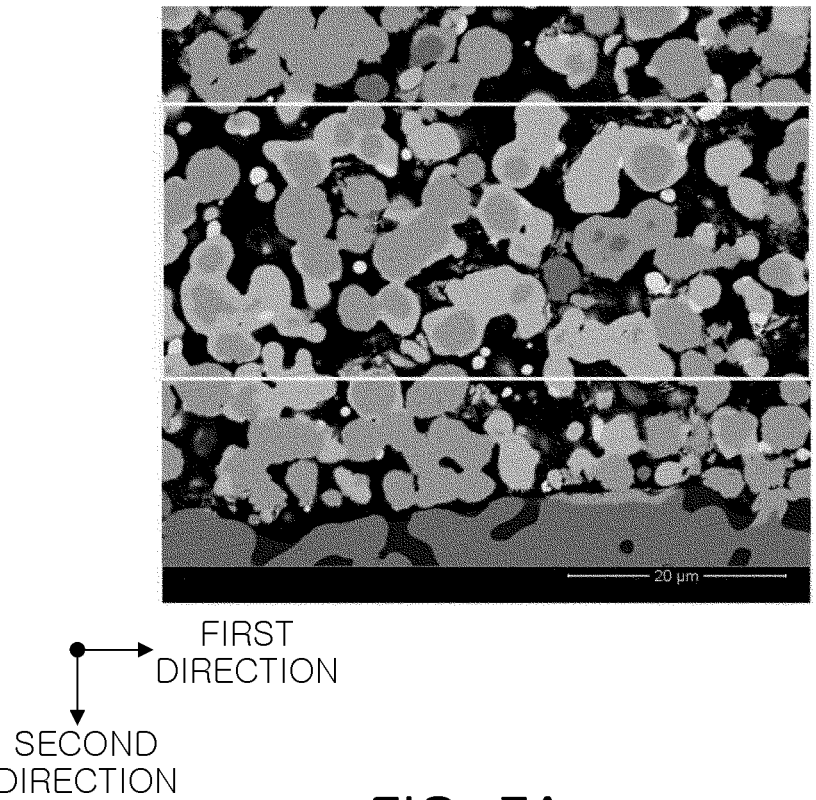
FIG. 7A illustrates an image of first and second directional cross-section of a conductive resin layer captured with a scanning electron microscope (SEM)
Figure 7B:
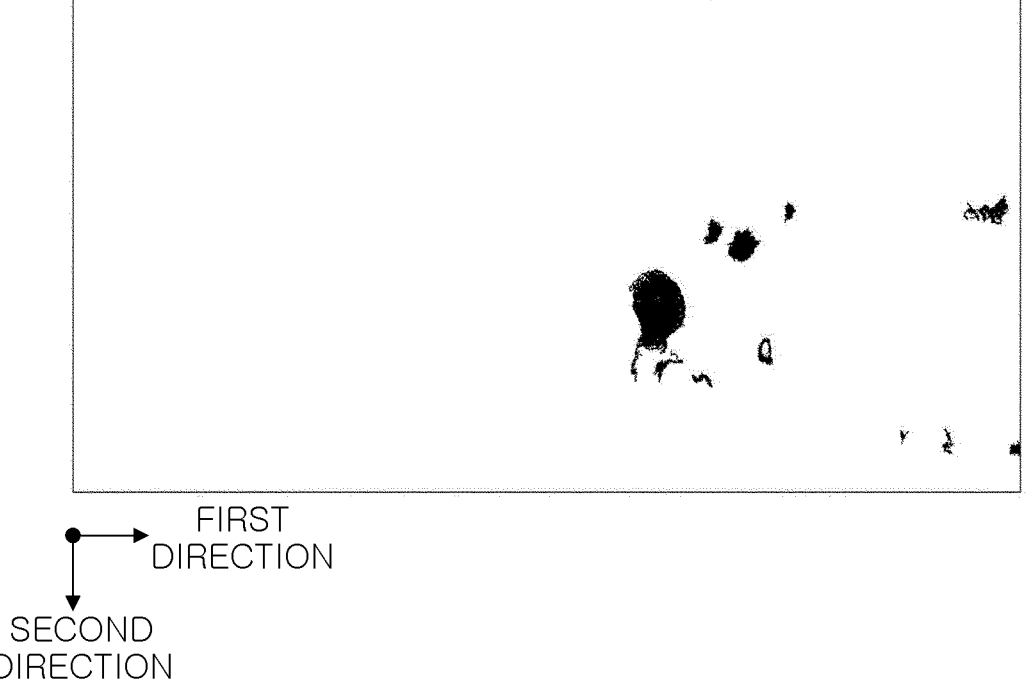
FIG. 7B is an image illustrating an area in which Cu particles are disposed among the areas indicated by the box indicated in FIG. 7A.
Figure 7C:
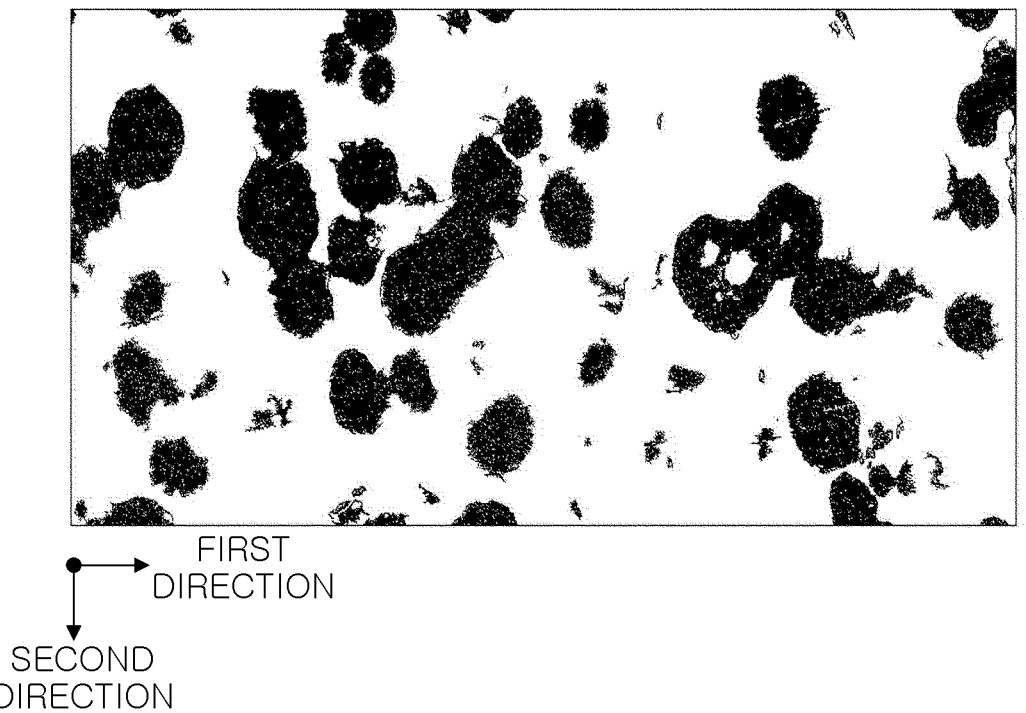
FIG. 7C is an image illustrating an area in which $Cu_3Sn$ is disposed among the areas indicated by the box indicated in FIG. 7A.
Figure 7D:
FIG. 7D is an image illustrating an area in which $Cu_6Sn_5$ is disposed among the areas indicated by the box indicated in FIG. 7A.

FIG. 7A illustrates an image obtained by capturing the first and second directional cross-section of the conductive resin layer with the scanning electron microscope (SEM). FIG. 7B is an image illustrating an area in which Cu particles are disposed among the areas indicated by the box indicated in FIG. 7A. FIG. 7C is an image illustrating an area in which $Cu_3Sn$ is disposed among the areas indicated by the box indicated in FIG. 7A. FIG. 7D is an image illustrating an area in which $Cu_6Sn_5$ is disposed among the areas indicated by the box indicated in FIG. 7A.

Referring to FIGS. 7A to 7D, the area indicated by the box indicated in FIG. 7A in which a first directional size is 59 μm to 149 μm and a second directional size is 25 μm to 50 μm based on the center of the second direction among the cross-sectional areas of the conductive resin layer was analyzed by energy dispersion spectroscopy (EDS), and accordingly, Cu particles, $Cu_3Sn$, and $Cu_6Sn_5$ were specified and then treated with the ImageJ program.

FIG. 7B illustrates that among areas indicated by the box, an area in which the Cu particles are disposed is marked in black, and the rest is marked in white, and FIG. 7C illustrates that among areas indicated by the box, an area in which $Cu_3Sn$ is disposed is marked in black, and the rest is marked in white, and FIG. 7D illustrates that among areas indicated by the box, an area in which $Cu_6Sn_5$ is disposed is marked in black, and the rest is marked in white.

Next, with regard to 10 samples for each test number through the images of FIGS. 7B to 7D, after measuring the ratio of the areas of each of the Cu particles, $Cu_3Sn$, and $Cu_6Sn_5$ to the total area occupied by the Cu particles, $Cu_3Sn$, and $Cu_6Sn_5$, average values thereof are described in Table 1 below.

Whether or not a lifting phenomenon of Table 1 occurs was evaluated by mounting 80 samples for each test number on a substrate and then applying reflow to the mounted samples. Then, the samples mounted on the substrate were cut in the first and second directions, and then the first and second external electrodes of each sample were captured with X-rays, respectively. In this case, when a bright band is present in the external electrode, it was evaluated that the lifting phenomenon occurred, and the number of samples in which the lifting phenomenon occurred among the 80 samples is listed in Table 1 below.

Whether Sn is eluted or not was determined in the following operations. After cutting each sample in the first and second directions before forming the plating layer, the first external electrode and the second external electrode of each sample were captured with the scanning electron microscope (SEM), respectively, and then, these results were indicated as a case in which Sn is eluted (NG) and a case in which Sn is not eluted (OK) to the outer surface of the conductive resin layer.

TABLE 1

| Test No. | Area Ratio | | | Lifting | Sn elution |
|---|---|---|---|---|---|
| | $Cu_3Sn$ | $Cu_6Sn_5$ | Cu particles | | |
| 1 | 1.88 | 96.19 | 1.93 | 0/80 | OK |
| 2 | 2.47 | 97.23 | 0.30 | 0/80 | OK |
| 3 | 9.67 | 31.54 | 58.79 | 0/80 | OK |
| 4 | 20.87 | 50.78 | 28.35 | 0/80 | OK |
| 5 | 24.58 | 58.36 | 17.06 | 0/80 | OK |
| 6 | 28.17 | 46.61 | 25.22 | 0/80 | OK |
| 7 | 31.67 | 48.71 | 19.62 | 0/80 | OK |
| 8 | 38.89 | 37.03 | 24.08 | 0/80 | OK |
| 9 | 37.83 | 20.45 | 41.72 | 11/80 | OK |
| 10 | 40.58 | 17.09 | 42.33 | 3/80 | OK |
| 11 | 43.71 | 56.29 | 0.00 | Not Evaluable | NG |
| 12 | 53.09 | 31.69 | 15.22 | 2/80 | OK |
| 13 | 57.91 | 39.14 | 2.95 | 5/80 | OK |
| 14 | 58.61 | 40.36 | 1.03 | 53/80 | OK |
| 15 | 60.23 | 33.79 | 5.98 | 18/80 | OK |
| 16 | 77.80 | 16.14 | 6.06 | 12/80 | OK |
| 17 | 82.15 | 0.00 | 17.85 | 27/80 | OK |

Referring to Table 1, in Test Nos. 1 to 8, it was confirmed that the ratio of the area occupied by $Cu_3Sn$ to the total area occupied by the Cu particles, $Cu_3Sn$, and $Cu_6Sn_5$ was 1.88% to 38.89%, and the ratio of the area occupied by $Cu_6Sn_5$ to the total area occupied by the Cu particles, $Cu_3Sn$, and $Cu_6Sn_5$ was 31.54% to 97.23%, which did not result in lifting defects and Sn elution defects.

On the other hand, in Test Nos. 9 to 10 and 12 to 17, it was confirmed that the area occupied by $Cu_3Sn$ to the total area occupied by the Cu particles, $Cu_3Sn$, and $Cu_6Sn_5$ was more than 38.89%, or the ratio of the ratio of the area occupied by $Cu_6Sn_5$ to the total area occupied by the Cu particles, $Cu_3Sn$, and $Cu_6Sn_5$ was less than 31.54%, which resulted in the lifting defects.

In addition, in Test No. 11, it was confirmed that the ratio of the area occupied by Cu particles to the total area occupied by the Cu particles, $Cu_3Sn$, and $Cu_6Sn_5$ was less than 0.3%, which resulted in defects in which Sn was eluted to the outer surface of the conductive resin layer. For this reason, the plating layer could not be formed on the conductive resin layer, and thus it was impossible to evaluate the occurrence of the lifting defects.

The present disclosure is not limited to the above-described embodiments and the accompanying drawings, and is intended to be limited by the appended claims. Therefore, those of ordinary skill in the art may make various replacements, modifications, or changes without departing from the scope of the present invention defined by the appended claims, and these replacements, modifications, or changes should be construed as being included in the scope of the present invention.

In addition, the expression 'one embodiment' used in the present disclosure does not mean the same embodiment, and is provided to emphasize and explain different unique characteristics. However, the embodiments presented above do not preclude being implemented in combination with the features of another embodiment. For example, although items described in a specific embodiment are not described in another embodiment, the items may be understood as a description related to another embodiment unless a description opposite or contradictory to the items is in another embodiment.

What is claimed is:

1. A multilayer electronic component, comprising:
a body in which a dielectric layer and an internal electrode are alternately arranged in a first direction, the body including first and second surfaces opposing each other in the first direction, third and fourth surfaces connected to the first and second surfaces and opposing each other in a second direction, and fifth and sixth surfaces connected to the first to fourth surfaces and opposing each other in a third direction; and
an external electrode including an electrode layer disposed on the third and fourth surfaces and a conductive resin layer disposed on the electrode layer,
wherein the conductive resin layer includes a resin and conductive particles including Cu particles, $Cu_3Sn$, and $Cu_6Sn_5$,
along the first and second directions, in a cross-section of the conductive resin layer, a ratio of an area occupied by $Cu_3Sn$ to a total area occupied by the Cu particles, $Cu_3Sn$, and $Cu_6Sn_5$ is 1.88% to 38.89%, and
a ratio of an area occupied by $Cu_6Sn_5$ to the total area occupied by the Cu particles, $Cu_3Sn$ and $Cu_6Sn_5$ is 31.54% to 97.23%.

2. The multilayer electronic component according to claim 1, wherein in the cross-section of the conductive resin layer, a ratio of an area occupied by the Cu particles to the total area occupied by the Cu particles, $Cu_3Sn$, and $Cu_6Sn_5$ is 0.3% or more.

3. The multilayer electronic component according to claim 2, wherein in the cross-section of the conductive resin layer, the ratio of the area occupied by the Cu particles to the total area occupied by the Cu particles, $Cu_3Sn$, and $Cu_6Sn_5$ is 0.3% or more and 58.79% or less.

4. The multilayer electronic component according to claim 1, wherein the cross-section of the conductive resin layer is a cross-section cut from the center of the body in the third direction.

5. The multilayer electronic component according to claim 4, wherein the ratio of the area occupied by $Cu_3Sn$ and the ratio of the area occupied by $Cu_6Sn_5$ are measured in an area in which a first directional size is 59 μm to 149 μm and a second directional size is 25 μm to 50 μm in the cross-section of the conductive resin layer.

6. The multilayer electronic component according to claim 1, wherein the conductive particles further include $Ag_3Sn$.

7. The multilayer electronic component according to claim 6, wherein in the cross-section of the conductive resin layer, a ratio of an area occupied by $Ag_3Sn$ to a total area occupied by the conductive particles is smaller than a ratio of the area occupied by $Cu_3Sn$ to the total area occupied by the conductive particles.

8. The multilayer electronic component according to claim 1, wherein the external electrode further includes an interface layer disposed between the electrode layer and the conductive resin layer, and the interface layer includes an intermetallic compound.

9. The multilayer electronic component according to claim 8, wherein the external electrode further includes a plating layer disposed on the conductive resin layer, and at least some of the conductive particles connect the interface layer and the plating layer.

10. The multilayer electronic component according to claim 8, wherein the electrode layer includes a first metal and glass.

11. The multilayer electronic component according to claim 10, wherein the intermetallic compound is an intermetallic compound between the first metal included in the electrode layer and a low melting point metal having a lower melting point than the first metal included in the electrode layer.

12. The multilayer electronic component according to claim 1, wherein the internal electrode includes a first internal electrode connected to the third surface, and a second internal electrode connected to the fourth surface, and the external electrode includes a first external electrode disposed on the third surface and connected to the first internal electrode, and a second external electrode disposed on the fourth surface and connected to the second internal electrode.

13. A multilayer electronic component, comprising:

a body in which a dielectric layer and an internal electrode are alternately arranged in a first direction, the body including first and second surfaces opposing each other in the first direction, and third and fourth surfaces connected to the first and second surfaces and opposing each other in a second direction; and an external electrode including an electrode layer disposed on the third and fourth surfaces and a conductive resin layer disposed on the electrode layer, wherein the conductive resin layer includes a resin and conductive particles including Cu particles, $Cu_3Sn$, and $Cu_6Sn_5$, and along the first and second directions, in a cross-section of the conductive resin layer, a ratio of an area occupied by $Cu_3Sn$ to a total area occupied by the Cu particles, $Cu_3Sn$, and $Cu_6Sn_5$ is 1.88% to 38.89%.

14. The multilayer electronic component according to claim 13, wherein a ratio of an area occupied by $Cu_6Sn_5$ to the total area occupied by the Cu particles, $Cu_3Sn$, and $Cu_6Sn_5$ is 31.54% to 97.23%.

15. The multilayer electronic component according to claim 13, wherein in the cross-section of the conductive resin layer, a ratio of an area occupied by the Cu particles to the total area occupied by the Cu particles, $Cu_3Sn$, and $Cu_6Sn_5$ is 0.3% or more.

16. The multilayer electronic component according to claim 15, wherein in the cross-section of the conductive resin layer, the ratio of the area occupied by the Cu particles to the total area occupied by the Cu particles, $Cu_3Sn$, and $Cu_6Sn_5$ is 0.3% or more and 58.79% or less.

* * * * *